May 30, 1950     H. C. PARKER     2,509,695
CLARIFYING PROCESS AND APPARATUS
Filed Dec. 12, 1944     2 Sheets-Sheet 1

Inventor
Henry C. Parker
By
Attorney

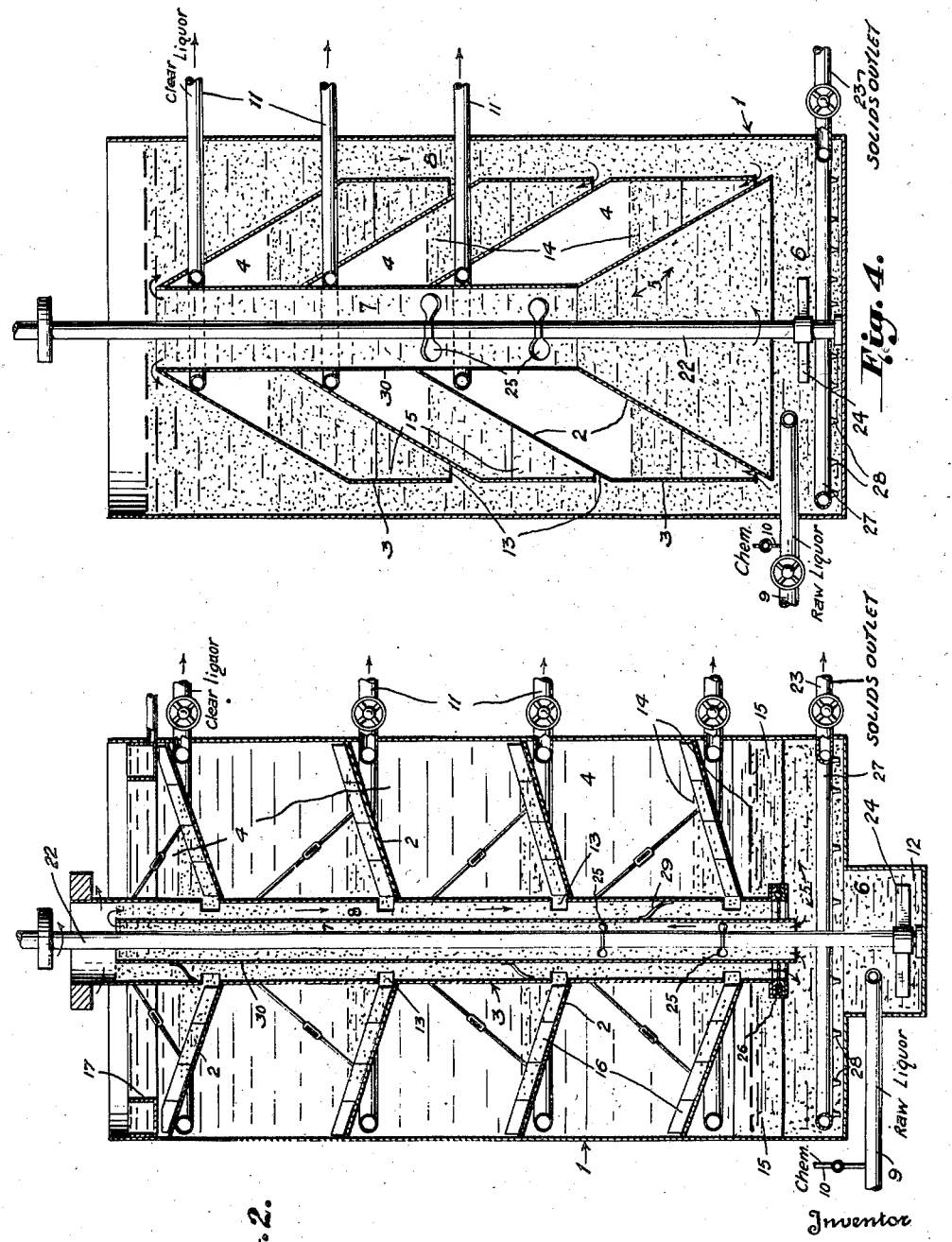

Patented May 30, 1950

2,509,695

UNITED STATES PATENT OFFICE 2,509,695

CLARIFYING PROCESS AND APPARATUS

Henry C. Parker, Washington, D. C., assignor to Infilco Incorporated, Chicago, Ill., a corporation of Delaware Application December 12, 1944, Serial No. 567,874

12 Claims. (Cl. 210—16)

This invention relates to clarifying process and apparatus; and it includes a clarifier suitable for use in clarifying and purifying raw liquors; said clarifier comprising a tank, a plurality of spaced parallel trays supported coaxially in said tank and a substantially vertical partition or baffle means associated with said trays, the trays and baffle means cooperating to separate said tank into a plurality of superposed and substantially completely enclosed or segregated clarifying zones and a vertical passageway for liquor containing solids undergoing flocculation, means for introducing into said tank the raw liquor to be clarified and any chemicals required to produce precipitation of impurities in said raw liquor, means for agitating the liquid in the bottom of the tank and for forcing the liquid upwardly through said vertical passageway at a rate sufficient to produce a substantially uniform suspension of solids undergoing flocculation extending from the bottom substantially to the top of said tank, and to return a portion of the liquid from the top to the bottom of the tank through another path for mixing with further quantities of raw water and reagent, vertically spaced openings for diverting portions of said suspension laterally into the bottoms of said clarifying zones, means for withdrawing clear liquor from the tops of said clarifying zones and means for withdrawing precipitated sludge from said tank. The process of this invention comprises the steps of passing a raw liquor to be clarified and any chemicals required to produce precipitation of impurities from said liquor, into the bottom of a tank, mixing said raw liquor in the bottom of said tank with recycled liquor and solids undergoing flocculation drawn from the top of said tank, agitating said mixture and passing it in a stream upwardly to the top of said tank at a rate sufficient to produce a substantially uniform suspension of agitated solids undergoing flocculation extending from the bottom substantially to the top of said tank, bleeding off side streams from said suspension and passing them substantially horizontally into the bottom of each of a plurality of superposed clarifying zones, withdrawing clear liquor from the top of each of said clarifying zones and withdrawing precipitated sludge from said tank, all as more fully hereinafter set forth and as claimed.

Rather recently the water clarifying art has seen a tendency to abandon multi-tray clarifiers in favor of the so-called rapid-flow or slurry type of clarifier. The latter generally employs a tank provided with baffles dividing the tank into a bottom mixing zone and a single upper clarifying zone, sufficient agitation being provided in the mixing zone to produce a bed of suspended solids undergoing flocculation, through which suspension the liquor undergoing clarification is forced to pass on its way to the clear liquor overflow. A rather definite interface is formed between the bed of suspended solids and the clear liquor and in several of the new designs this interface extends over only a fraction of the cross sectional area of the tank. It is rather elementary that the larger this interface is, the greater the capacity of the tank, other factors being equal.

The rapid-flow or slurry type clarifiers which employ a single clarifying zone appear to be rather definitely limited with respect to the maximum capacity of the individual units for the reason that, when large diameter units are employed, boil-ups tend to take place at the suspension clear liquor interface owing to the difficulties of obtaining a uniform upflow over the entire area of the interface. On the other hand an increase in height of the tank produces but little increase in capacity. In view of these limitations it seems surprising that such little progress has been made in designing multi-tray clarifiers making use of the rapid-flow principle, that is, the initial mixing of the raw water with a suspension containing recycled particles undergoing flocculation with sufficient agitation and upflow rate to keep the particles in suspension in the liquid and to form a bed or body of suspended particles through which the liquor is passed on its way to the clear liquor off-take.

I have discovered that it is rather a simple matter to expand the volume of the suspended solids utilized in the rapid-flow type of clarifier, at least in a vertical direction, and that, when this is done, it is possible to bleed off side streams from this suspension leading to a plurality of superposed segregated clarifying zones or chambers arranged in a manner quite similar to that used in the conventional multi-tray clarifiers. In this new design a mixing and agitating zone is provided in the bottom of the clarifying tank and vertical baffles are employed which together with superposed trays define the clarifying zones as well as an agitated slurry zone, including a vertical passageway leading substantially to the top of the tank, sufficient agitation and rate of upflow through this passageway being provided to produce a substantially uniform suspension of solids undergoing flocculation from the top to the bottom of the tank. This suspension fills the entire tank with the exception of the clarifying zones which may either surround the passageway or be surrounded by the said passageway. In order to produce a sufficiently rapid upflow it is advantageous to recycle suspension from the top to the bottom of the tank, to be mixed with the incoming raw liquor. The side streams leading to the clarifying zones are bled from either the upflowing stream or the downward return flow. The recirculation stream may be passed through a pipe outside the tank proper, or it may be passed through a passage inside the tank. The volume of this recirculation stream should be at least equal to the volume of clear liquor drawn off at one of said clarifying zones. It is advantageous to provide rotary agitation in a horizontal plane in the mixing zone. And this rotary motion can, if desired, be continued in the uptake to the top of the tank. If the suspension is in rotation at the points at which the side streams are bled off to the clarifying zones, baffles should be provided in the bottoms of these zones since it is important to have quiescent conditions in the upper regions of these zones.

It might seem that it would be difficult to obtain a sufficiently rapid upflow in the uptake of my clarifier to produce a substantially uniform suspension of solid particles extending from the top to the bottom of the tank. But I have found that the power required for agitation and recycling in my tank is considerably less in proportion than in the single zone rapid-flow clarifier. The operating cost per gallon clarified is substantially reduced. This is explained by the fact that the side streams leading to the superposed clarifying zones contribute to the upflow velocity, each side stream contributing an amount sufficient to elevate the sludge bed a distance about equal to the height of that clarifying zone. The volume of the recycled liquor required is therefore considerably less in proportion than that required in the case of a single zone clarifier. Under usual operating conditions I prefer to recycle a volume of liquor which is from about 1 to 3 times the volume of clear liquor drawn off per clarifying zone.

The power required for the agitation in my clarifier is somewhat greater than that required for single zone clarifiers of similar diameter but considerably less than would be expected owing to the increased capacity, that is, the agitation per zone or per gallon clarified is substantially reduced. This is doubtless accounted for by the fact that the raw water supplies much of the energy required for the agitation since it is introduced tangentially into the mixing zone and thereby contributes to the rotary motion therein. The volume of this raw water is, of course, at least about twice that fed to a single zone clarifier of the same diameter. The total power consumed by my clarifier is usually only from about 1¼ to 2 times that consumed by a single zone clarifier of the same diameter, whereas the capacity of my clarifier may be from two to four times as great.

It is seen from the above that my new clarifier operates on the same general principle as the present-day rapid-flow or slurry type clarifiers except for the increased size of the suspended agitated slurry bed and for the bleeding off of side streams leading to a plurality of clarifying zones. The solids present in suspension in the agitated slurry bed, which occupies the entire volume of the tank outside the clarifying zones, are maintained in the state of incipient flocculation or precipitation; hence, when this mixture of solids and liquor is introduced into a quiescent clarifying zone, precipitation quickly takes place with the formation of a slurry-clear liquor interface only a slight distance above the bottom of the clarifying zone. It will be noted that there is a slurry-clear liquor interface in each of the clarifying zones. And the total cross section of these interfaces furnishes a rough measure of the relative over-all capacities of this general type of clarifier. It can be readily seen that the capacity of my clarifier can be readily made several times that of clarifiers employing a single clarifying zone having the same diameter. While my new clarifier is limited in diameter in much the same fashion as the present day rapid-flow clarifiers, it is not limited with respect to height and the capacity can be increased directly in proportion to the height, at least within reasonable limits.

The clarifying zones of my clarifier are advantageously provided with scrapers for scraping sludge deposited therein from the tops of the trays. This sludge is scraped into the portion of the agitated slurry whence the side streams are bled off, and will be resuspended in and mixed with the suspension and on its return to the mixing zone it will be suitable for use in the treatment of liquor undergoing clarification. Eventually the solids are withdrawn from the tank by conventional means. If the slope of the trays in my clarifier is sufficiently sharp, making an angle of 60° or thereabouts with the horizontal, no scrapers are required. This reduces the capacity somewhat, however.

My invention can be explained more specifically by reference to the accompanying drawings which show, more or less diagrammatically, several illustrative embodiments of a clarifier design within this invention which can be used in conducting my process. In this showing, Figure 1 is a vertical cross section through a clarifier having a plurality of substantially horizontal trays and provided with an outer recycling pipe.

Figure 2 is a vertical cross-sectional view of another embodiment of my invention.

Figure 4 is a vertical cross-sectional view of still another embodiment of my invention.

Figure 1:
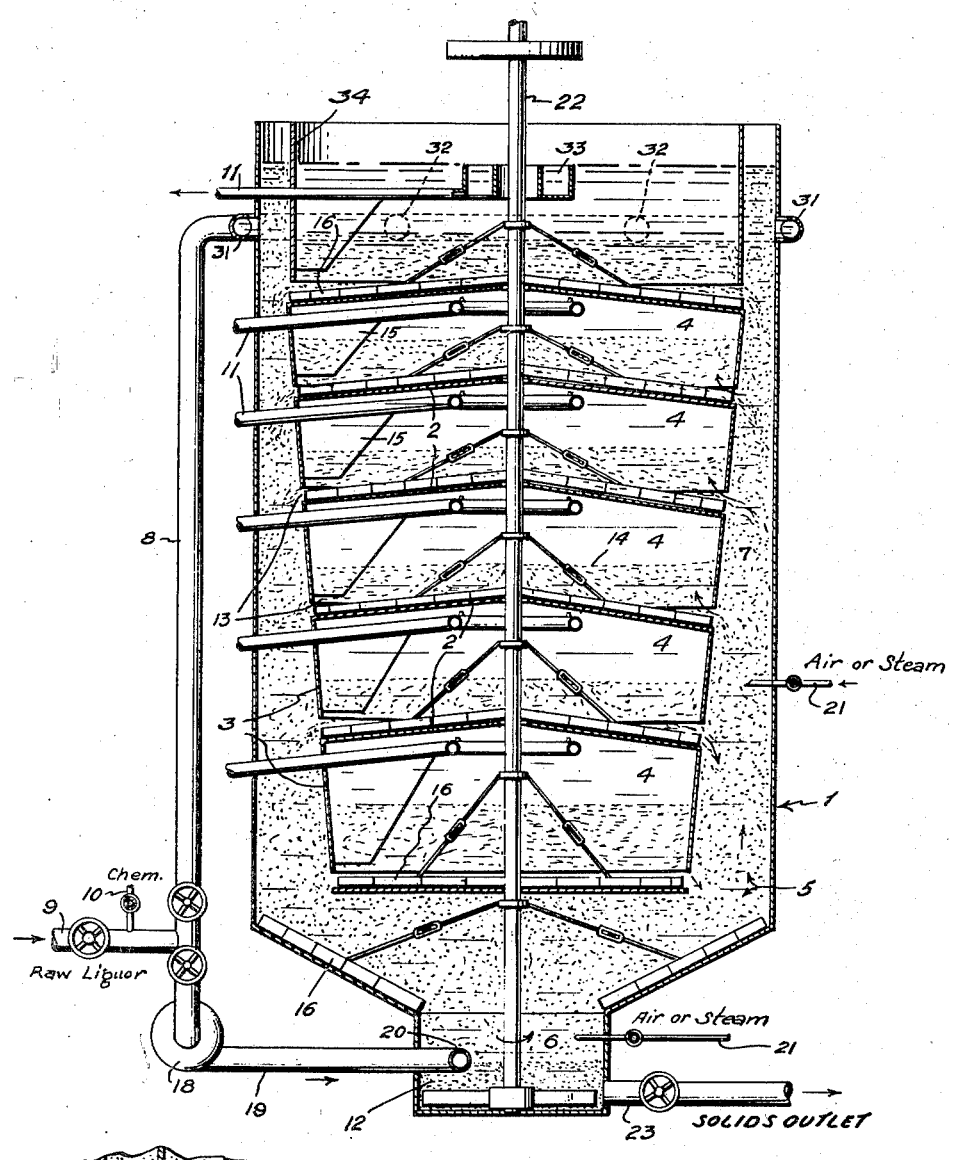

In the various figures like parts are designated by like reference numerals. In all embodiments of my invention the clarifier is constructed with an outer tank 1 in which are mounted a plurality of spaced parallel trays 2. Substantially vertical baffles or partitions 3 are provided which, together with the trays divide the tank into a plurality of clarifying zones 4 and an agitated slurry zone 5, which includes all the space outside the clarifying zones. The agitated slurry zone 5 comprises a mixing zone 6 at the bottom of the tank, an uptake passageway 7 and a downtake or recycle passageway 8. The tank is provided with raw liquor inlet 9, with an inlet 10 for chemicals and with clear liquor outlets 11. The mixing zone 6 may be of any suitable form, for example a sump in the bottom of the tank, as shown in Figures 1 and 2, or an enclosed space above the floor, as shown in Figure 4. The liquor to be clarifier finds its way from the agitated slurry zone 5 into the clarifying zones through restricted passages 13 which may be formed between the depending flanges and the tops of the next lower trays or by openings in a continuous baffle, as shown in Fig. 2. In each of the clarifying zones a slurry-clear liquor interface is formed as indicated at 14. Stilling baffles may be provided in the lower portions of the clarifying zones as indicated at 15. Scrapers 16 may be provided which operate to scrape precipitated sludge off the trays either into the uptake 7, as in Figure 1, or in the downtake 8, as in Figures 2 and 4. A solids draw-off 23 is provided at the bottom of the tank.

Referring now to Figure 1, in this embodiment the bell-shaped trays 2 are centrally mounted in the tank and have substantially horizontal upper surfaces. The peripheral uptake 7 is preferably tapered from the bottom to the top in order to produce a substantially uniform upward velocity. Owing to the fact that the volume of the upward stream diminishes as liquor is withdrawn at each clarifying zone, the cross section of the stream must be diminished correspondingly to retain the initial upward velocity. The recirculation passageway 8 of this embodiment is outside the tank and is fed from an upper manifold 31 connecting with a plurality of offtakes 32. A pump 18 is provided in the recirculation line and the raw liquor intake 9 discharges into pipe 8 on the suction side of this pump. The line 19 leading into the mixing sump 12 is advantageously provided with a tangentially arranged nozzle at its end 20 and this usually provides agitation which, together with the upflow velocity, is sufficient to produce a substantially uniform bed of agitated slurry from the bottom to the top of the tank, as indicated in the drawing. Additional agitation may, however, be provided by admitting air or steam through inlets 21. The central shaft 22 rotates the scrapers and hence is driven slowly in order to avoid disturbance of the slurry-clear liquor interface in the clarifying zones. The baffles 15 in these zones quickly still any rotary motion of the liquor entering these zones. The vertical baffle 34 at the top of the tank, which encloses the top clarifying zone, forms a peripheral passageway which is useful to collect any scum which may form. A central launder 33 is provided in the top clarifying zone for withdrawing clear liquor. This clarifier is particularly adapted to the clarification of liquors in which the precipitated sludge particles are rather light and flocculent, such as those obtained by treating raw waters with alum, alum and lime or ferrous sulfate and lime, for example, although it can be used in the handling of liquors carrying heavy sludges such as are formed in lime-soda water softening operations, for example.

In the embodiment of Figure 2 the central shaft 22 rotates rapidly and is provided with one or more agitators 24 at the bottom and impellers 25 in the uptake passage 7 which, in this embodiment is formed by a central pipe 30. The impellers serve to impel the liquor upwardly at a velocity sufficient to carry with it suspended slurry particles to the overflow at the top of the pipe 30 in such fashion that the suspension of agitated slurry in the upper section of the mixing zone, in the uptake 7 and in the downtake passage 8 is substantially uniform in density. The downtake passage 8 is concentric with the uptake passage 7 and is confined between the pipe 30 and the baffle 3. The sludge scrapers 16 may be affixed to the baffle 3, which is rotated slowly by means not shown, and this serves to drive the scrapers 16. The downtake baffle can be supported at the bottom by a bearing 26 mounted on baffles 15. Side streams are bled off from the agitated suspension in the downtake 8 through the openings 13 which lead into the bottoms of the clarifying zones. The sludge which deposits on the trays in these zones is discharged by the scrapers 16 through these same openings. Clarified liquor is withdrawn from the top of the clarifying zones through valved conduits 11. In the uppermost clarifying zone a launder 17 may be provided for withdrawing clear liquor. The opening at the bottom of the downtake may be either above or below the opening to the uptake, but it is preferably somewhat above. In order to be certain that the clarifier operates on the rapid-flow or slurry type principle, the flow through the uptake should be at least about 1¼ times and is preferably at least 1½ times the flow of raw liquor in order to ensure adequate recycling, that is, a flow of slurry from the downtake into the mixing zone at the bottom. Removal of solids in this embodiment is shown by means of an annular collecting pipe 27, which may be provided with pick-up nozzles 28. It will be noted that clarifying zones are provided from top to bottom of this embodiment, a total of 5 such zones being present. This embodiment therefore makes use of a large fraction of the volume of the tank for clarifying, as distinguished from mixing. The sump 12 at the bottom, together with the uptake and downtake, provides adequate mixing and agitating space, however. The central standpipe 30 can be made stationary and supported from the bottom of the tank or it may rotate slowly with the baffle 3 and be supported by braces 29 from this element, as shown.

Figure 3:
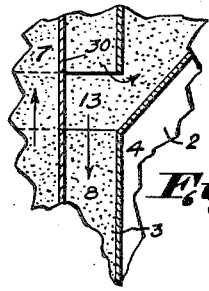
Figure 3 is a partial sectional view on an enlarged scale of a modified tray construction for the embodiment of Figure 2.

If the trays of this embodiment are sloped downwardly at an angle of about 60° to the horizontal the scrapers can be dispensed with and then the outer baffle 3 need not be rotated. In this case the openings 13 in this baffle extend entirely around the circumference making in effect a plurality of depending baffles which then form part of the trays, as shown in detail in Figure 3.

In the embodiment of Figure 4 a central standpipe 30 is employed as an uptake. The trays may slope away from this at an angle sufficiently sharp to cause deposited sludge to slide off without the use of scrapers. Peripheral depending flanges are provided which serve to define the peripheral downtake as well as the clarifying zones. The central shaft 22 is rotated rapidly and, as in the embodiment of Figure 2, the impellers 25 serve to impel the liquor undergoing clarification upwardly with sufficient velocity to produce a substantially uniform suspension of agitated slurry extending to the top of the tank. The space beneath the lowest tray and the space above the top tray provide ample space for mixing and flocculating; hence no mixing sump is required in this embodiment. The raw water and chemicals are introduced into the bottom of the tank tangentially thereby contributing to the agitation. Streams are bled off from the suspension in the downtake to feed the clarifying zones. If desired the direction of circulation in this embodiment can be reversed, the liquor passing upwardly at the periphery and downwardly through the central standpipe.

The operation of my clarifier is believed to be evident from the above description. It will be noted that in all embodiments raw water, chemicals and recycled liquor are fed into the bottom of the tank into a mixing zone in which rotary agitation is provided. The mixture then passes through an uptake to the top of the tank, the agitation and the uptake velocity being sufficient to produce a substantially uniform suspension of agitated slurry extending from the top to the bottom of the tank. This slurry contains flocculated solids which have been kept in suspension and also solids which have been deposited on the trays and shortly thereafter resuspended in the slurry—solids of both types being kept uniformly suspended throughout the agitated slurry zone.

5. A stream of the suspension, or slurry, is recycled from the top to the bottom of the tank to be mixed with the incoming raw liquor. Streams are bled off from this suspension either from the uptake or from the downtake to feed the clarifying zones. Solids are removed preferably from the bottom of the tank and clear liquor from the tops of the clarifying zones.

While I have described what I consider to be the best embodiments of my process and apparatus, it is evident, of course, that various modifications can be made in the specific procedures and structures which have been described without departing from the purview of this invention. The spacing of the trays in my clarifier can be varied with the type of water being treated. It is usually advantageous to have at least the lowest clarifying zone of somewhat greater depth than the other zones, since there is an inevitable tendency for more sludge to collect in this zone than the others. The slope of the trays can be varied considerably. For example, the trays can be made horizontal, if desired, like the lowermost tray in Figure 1. Additional agitation may be provided wherever required in order to be certain that the agitated slurry bed extends upwardly at least to the recycle drawoff and to the intake of the top clarifying zone. Solids may be drawn off at any suitable point from the agitated suspension, by the use of skimmers or other conventional means. If a separate mixing zone is employed to produce the desired suspension of solids undergoing flocculation, this suspension can be introduced at the top of the agitated slurry zone but sufficient agitation should be provided to ensure a substantially uniform suspension throughout this zone. Other modifications which fall within the scope of the following claims will be immediately evident to those skilled in this art.

What I claim is:

1. In the clarification and purification of raw liquors, the process which comprises passing a raw liquor to be clarified and reagent into a mixing zone in the lower portion of a tank, and there mixing said raw liquor and reagent with recycled liquor containing solids undergoing flocculation, agitating the mixture in the bottom of the tank and passing it upwardly with a rate of flow sufficient to produce a substantially uniform suspension of agitated solids undergoing flocculation extending from the bottom substantially to the top of the tank, returning a portion of said suspension from the top portion of said tank to its lower portion for admixing with entering raw liquor and reagent, bleeding off side streams from said suspension at a plurality of superposed levels spaced above said mixing zone and introducing these streams into the bottoms of a plurality of vertically abutting clarifying zones segregated from said agitated solids suspension, withdrawing clear liquor from the tops of these zones, returning solids from said clarifying zones to said suspension, and withdrawing excess solids from said suspension to waste.

2. A clarifier comprising a tank, a plurality of horizontally extending trays centrally mounted in said tank, peripheral flanges depending from said trays and defining a peripheral passageway extending from the lower portion of said tank substantially to the top of the tank and a plurality of superposed abutting clarifying chambers, said flanges extending downwardly to adjacent the subjacent trays and forming therewith flow restricting passageways communicating said peripheral passageway and said clarifying chambers, a central shaft mounted vertically in said tank, scraper arms attached to said shaft and adapted to scrape solids precipitated on said trays into said peripheral passageway, means for rotating said shaft, means in the lower portion of said tank for introducing a raw liquor to be clarified and a reagent and for supplying agitation sufficient to produce a substantially uniform suspension of solids undergoing flocculation extending from the bottom substantially to the top of said tank, means for recycling suspension from the top of said peripheral passageway to the bottom of said tank, means for withdrawing clear liquor from the upper portion of said clarifying chambers, and means for withdrawing solids from the bottom of said tank.

3. An apparatus for clarifying and purifying raw liquors which comprises a tank, vertical baffle means in said tank extending from the top to the lower portion of said tank and forming therein a central flow space and a peripheral quiescent space, a plurality of spaced parallel trays mounted in said tank, and subdividing said quiescent space into a plurality of superposed clarifying chambers, a standpipe centrally mounted in said flow space and dividing said flow space into an upflow and a downflow conduit, said standpipe being open at top and bottom and extending from the lower portion of the tank to an elevation adjacent but below the top of the tank, means for introducing liquor to be purified and chemicals into the bottom of said tank, means for mixing and agitating the liquor and chemicals in the bottom of the tank with a suspension of solids accumulated from previously treated liquor and for forcing the mixture upwardly through said upflow conduit and back to the bottom of said tank through said downflow conduit at a rate sufficient to produce a substantially uniform suspension of agitated sludge solids undergoing flocculation extending from the bottom to the top of the tank, said vertical baffle means having a slot adjacent the upper surface of each of said trays, means for scraping solids from said trays through said slots, means for withdrawing clear liquor from the tops of said clarifying zones and means for withdrawing solids from said tank.

4. An apparatus for clarifying and purifying raw liquors which comprises a tank, a plurality of vertically spaced trays mounted centrally in said tank, a peripheral depending flange on each superposed tray extending downwardly to adjacent the next lower tray and forming a restricted flow channel between said flange and such lower tray, said flanges, with the wall of said tank, defining a peripheral passageway extending from the lower portion of said tank substantially to the top thereof, vertical partition means centrally mounted in said tank and forming a central passageway leading from adjacent the bottom substantially to the top of said tank, said partition means cooperating with said trays and flanges to form segregated clarifying chambers between superposed trays, means for introducing liquor to be purified and any chemicals required to produce the precipitation of impurities into the bottom portion of said tank, means for agitating the liquor in the bottom of said tank and for mixing it with a suspension of previously precipitated solids and circulating liquor and suspension upwardly through one of said passageways and downwardly through the other at a rate sufficient to produce a substantially uniform suspension of agitated solids undergoing flocculation extending from the bottom to the top of said tank, means for withdrawing clear liquor from the tops of said clarifying chambers and means for withdrawing solids from the tank.

5. A liquid treating apparatus comprising a tank, at least two vertically spaced centrally mounted bell shaped trays in said tank, the upper of said trays having a peripheral depending flange, the lower end of said flange being spaced a short distance above the outer edge of the lower tray, an annular substantially vertical baffle extending downwardly from the top of said tank, the lower end of said baffle being spaced a short distance above the outer edge of the upper tray, said trays, said flange and said baffle forming in said tank central clarifying chambers and a peripheral passageway communicating with said clarifying chambers through narrow annular channels, means for introducing liquor to be treated and reagent into the lower portion of said tank in such manner as to agitate the contents of said lower portion of said tank, an outlet for clarified liquid from the upper portion of each of said clarifying chambers, and a waste outlet from a lower portion of said tank.

6. A slurry type clarifying apparatus comprising a tank, a bottom tray and a plurality of superposed spaced upper trays mounted centrally in said tank, the upper trays having peripheral depending flanges which help to define a peripheral passageway extending from the bottom tray to the top tray and a plurality of central clarifying chambers, said depending flanges extending close to the outer margins of the next lower trays leaving relatively narrow annular flow channels therebetween communicating said clarifying chambers with said peripheral passageway, an annular substantially vertical baffle extending from the top of the tank to a point close to the outer margin of the top tray leaving a relatively narrow annular flow channel therebetween; said vertical baffle defining an extension of said peripheral passageway, extending to the top of the tank and adapted to serve as a scum channel, and an inner top clarifying chamber; means for introducing liquor to be clarified and any chemicals required for clarifying said liquor into the bottom of the tank, means for agitating and mixing the liquor in the bottom of the tank, said means being of sufficient capacity to produce a substantially uniform suspension of agitated solids undergoing flocculation extending upwardly into said peripheral passageway to an elevation above said top tray, means for withdrawing clarified liquor from the clarifying chambers and means for removing sludge from said trays and for withdrawing solids from said tank.

7. Liquid treating apparatus comprising a tank having a mixing zone in the lower portion thereof, vertically extending annular partition means in said tank forming in the space in said tank above said mixing zone a vertical passageway extending from the top of the tank to the mixing zone, and a quiescent clarification space located above said mixing zone, a horizontally extending bottom tray separating said clarification space from said mixing zone, at least one horizontally extending tray in said clarification space positioned to subdivide said clarification space into adjacent superposed clarification chambers, a conduit forming a second passageway from the top of the tank to the mixing zone, said partition means being so constructed and arranged as to form flow restricting passageways affording communication from the vertical passageway into the lower portions of said clarification chambers, agitating means associated with said tank and positioned to cause rotary motion of the contents of said mixing zone and a circulation therefrom through said passageways back to the mixing zone, means for withdrawing clarified liquid from the upper portion of said clarification chambers, an inlet for liquid to be treated into said mixing zone, and a waste outlet from a lower portion of said tank.

8. A slurry type liquid treating apparatus comprising a tank, a plurality of vertically spaced inclined trays centrally mounted in said tank, vertically extending partition means in said tank and so constructed and arranged as to form with said trays a plurality of vertically abutting quiescent clarifying chambers, an agitated slurry holding space extending from the bottom to the top of said tank, and a plurality of narrow flow channels affording communication between said agitated slurry holding space and the lower portions of said clarifying chambers, a conduit leading from said tank at an elevation above the uppermost tray and discharging into said tank below the lowermost tray, means including a pump on said conduit for agitating the contents of said slurry holding space and maintaining a cyclic flow from the bottom of said slurry holding space to the top thereof and back to the bottom of said slurry holding space through said conduit, an inlet for liquor to be treated and reagent into said conduit on the suction side of said pump, an outlet for clarified liquor from the upper portion of each of said clarifying chambers, and a waste outlet from the agitated slurry holding space of said tank.

9. The apparatus of claim 8 including also a vertical shaft centrally mounted in said tank, scrapers attached to said shaft and adapted to scrape solids from said trays into said slurry holding space, and means for rotating said shaft.

10. Liquid treating apparatus comprising a tank, vertically extending partition means in said tank dividing said tank into an agitated slurry space having an upflow zone and a downflow zone and a quiescent clarification space, a plurality of inclined horizontally extending trays in said tank positioned to subdivide said clarification space into a plurality of superposed clarifying chambers, said partition means being so constructed and arranged as to form flow restricting passageways communicating the lower portions of said clarifying chambers with said slurry holding space, agitating means in the slurry space adapted to cause rotary motion of the contents of said slurry space and a circulation from the bottom of the slurry space to the top thereof and back to the bottom of the slurry space, means for withdrawing clarified liquid from the upper portion of said clarifying chambers, and a waste outlet from said tank.

11. An apparatus for clarifying raw liquors which comprises a tank, a plurality of vertically spaced trays mounted centrally in said tank, a peripheral depending flange on each superposed tray extending downwardly to adjacent the next lower tray and forming a restricted flow channel between said flange and such lower tray, said flanges, with the wall of said tank, defining a peripheral passageway extending from the lower portion of said tank to an upper portion thereof, vertical partition means centrally mounted in said tank and forming a central passageway leading from the lower portion of said tank to an upper portion thereof, said partition means cooperating with said trays and flanges to form segregated clarifying chambers between superposed trays, means for introducing liquor to be clarified into the lower portion of said tank, and for mixing it with a suspension of previously precipitated solids and maintaining a circulation upwardly through one of said passageways, and downwardly through the other, means for withdrawing clear liquor from the tops of said clarifying chambers and means for withdrawing solids from said tank.

12. Liquid treating apparatus comprising a tank having a mixing zone in a lower portion thereof, vertically extending annular partition means in said tank forming in the space in said tank above said mixing zone a vertical passageway extending from an upper level of the tank to the mixing zone, and a quiescent clarification space located above said mixing zone, a horizontally extending tray separating said clarification space from said mixing zone, at least one horizontally extending tray in said clarification space positioned to subdivide said clarification space into adjacent superposed clarifying chambers, a conduit forming a second passageway from an upper level of the tank to the mixing zone, said partition means being so constructed and arranged as to form flow restricting passageways affording communication from the vertical passageway into the lower portions of said clarifying chambers, inlet means for liquid to be clarified discharging into said mixing zone and positioned to cause rotary motion of the contents of said mixing zone and a circulation therefrom through said passageways back to the mixing zone, means for withdrawing clarified liquid from the upper portion of said clarifying chambers, and a waste outlet from a lower portion of said tank.

HENRY C. PARKER.

REFERENCES CITED

The following references are of record in the file of this patent:

UNITED STATES PATENTS

| Number | Name | Date |
|---|---|---|
| 1,678,788 | Remick | July 31, 1928 |
| 1,752,789 | Downes | Apr. 1, 1930 |
| 2,003,357 | Gilchrist | June 4, 1935 |
| 2,103,829 | Seip | Dec. 28, 1937 |
| 2,245,587 | Hughes | June 17, 1941 |
| 2,245,588 | Hughes | June 17, 1941 |
| 2,314,977 | Green | Mar. 30, 1943 |
| 2,343,836 | Weber | Mar. 7, 1944 |
| 2,347,318 | Gurney | Apr. 25, 1944 |
| 2,348,123 | Green et al. | May 2, 1944 |
| 2,353,358 | Proger | July 11, 1944 |
| 2,355,069 | Green | Aug. 8, 1944 |
| 2,355,564 | Sebald | Aug. 8, 1944 |
| 2,365,293 | Robinson | Dec. 19, 1944 |
| 2,370,356 | Kamp et al. | Feb. 27, 1945 |
| 2,377,545 | Felsecker | June 5, 1945 |

FOREIGN PATENTS

| Number | Country | Date |
|---|---|---|
| 837,663 | France | Nov. 18, 1938 |